(12) United States Patent
Bell

(10) Patent No.: US 12,535,123 B2
(45) Date of Patent: Jan. 27, 2026

(54) ELECTRIC MOTOR HAVING STATIONARY DRIVE MECHANISM

(71) Applicant: Archibald Corporation, Radiant, VA (US)

(72) Inventor: Stephen Bell, Radiant, VA (US)

(73) Assignee: Archibald Corporation, Radiant, VA (US)

( * ) Notice: Subject to any disclaimer, the term of this patent is extended or adjusted under 35 U.S.C. 154(b) by 198 days.

(21) Appl. No.: 18/420,331

(22) Filed: Jan. 23, 2024

(65) Prior Publication Data

US 2024/0263689 A1  Aug. 8, 2024

Related U.S. Application Data

(60) Provisional application No. 63/444,028, filed on Feb. 8, 2023.

(51) Int. Cl.
| | |
|---|---|
| *H02K 11/25* | (2016.01) |
| *B29C 64/236* | (2017.01) |
| *B29C 64/393* | (2017.01) |
| *B33Y 30/00* | (2015.01) |
| *B33Y 50/02* | (2015.01) |

(Continued)

(52) U.S. Cl.
CPC ....... *F16H 25/2204* (2013.01); *B29C 64/236* (2017.08); *B29C 64/393* (2017.08); *B33Y 30/00* (2014.12); *B33Y 50/02* (2014.12); *F16H 25/2021* (2013.01); *H02K 7/06* (2013.01); *H02K 11/21* (2016.01); *H02K 11/24* (2016.01); *H02K 11/25* (2016.01); *H02K 11/30* (2016.01);

(Continued)

(58) Field of Classification Search
CPC .......... H02K 7/06; H02K 11/21; H02K 11/24; H02K 11/25; H02K 11/30
See application file for complete search history.

(56) References Cited

U.S. PATENT DOCUMENTS

| | | |
|---|---|---|
| 5,799,543 A | 9/1998 | Nagai et al. |
| 2005/0116674 A1 | 6/2005 | Nagai et al. |

(Continued)

OTHER PUBLICATIONS

International Searching Authority of the PCT (US); "Notification of Transmittal of the International Search Report and the Written Opinion of the International Searching Authority, of the Declaration" dated May 16, 2024; PCT Application No. PCT/US2412874; pp. 1-11 (2024).

*Primary Examiner* — Muhammad S Islam
(74) *Attorney, Agent, or Firm* — FisherBroyles LLP; Kevin D. Jablonski

(57) ABSTRACT

A servo motor system having a direct drive motor, a controller, an encoder and a ball screw nut. The system may include a direct drive motor and a controller communicatively coupled to the direct drive motor and configured to provide a control signal to the direct drive motor to control rotational motion. The system may further include an encoder coupled to the direct drive motor and the controller and configured to provide a feedback signal to the controller indictive of the rotational motion of the direct drive motor. The system may further include a rotatably attached ball screw nut coupled to a housing for the direct drive motor, the ball screw nut configured to engage a ball screw shaft such that rotational motion imparted by the direct drive motor causes the servo motor system to move about the ball screw shaft while the ball screw shaft remains stationary.

20 Claims, 4 Drawing Sheets

(51) Int. Cl.
*F16H 25/20* (2006.01)
*F16H 25/22* (2006.01)
*H02K 7/06* (2006.01)
*H02K 11/21* (2016.01)
*H02K 11/24* (2016.01)
*H02K 11/30* (2016.01)

(52) U.S. Cl.
CPC ............... *F16H 2025/2075* (2013.01); *F16H 2025/2081* (2013.01); *F16H 2025/2084* (2013.01)

(56) References Cited

U.S. PATENT DOCUMENTS

| | | |
|---|---|---|
| 2005/0255186 A1 | 11/2005 | Hiraga |
| 2006/0207536 A1 | 9/2006 | Todo et al. |
| 2016/0193785 A1 | 7/2016 | Bell et al. |
| 2022/0065361 A1* | 3/2022 | Adams .................... F16K 27/12 |

* cited by examiner

ELECTRIC MOTOR HAVING STATIONARY DRIVE MECHANISM

PRIORITY CLAIM

This application claims the benefit of U.S. Provisional Application No. 63/444,028 entitled "ELECTRIC MOTOR HAVING STATIONARY DRIVE MECHANISM" filed Feb. 8, 2023, which is incorporated by reference in its entirety herein for all purposes.

BACKGROUND

Electric motors are used in many systems to control precise position of objects desired to be maneuvered. For example, servo motors (a specific application of an electric motor) may sense the rotary position of a rotating shaft to determine precise rotations for maneuvering attached objects to specific position as needed. Servo motors are used in many applications including printers, robotics, drones, and the like. The ability to precisely maneuver attached objects to precise positions allows for high precision ion control of attached end effectors.

However, as servo motors grow faster and more efficient in maneuvering end effectors, speed to the maneuvering reaches a critical point before additional physical world restraints impose problems. As end effectors may be moved quickly by servo motors, inertia of the end effector may lead to position overshoot and/or shaft "whipping" or "whirling." Shaft whipping occurs at these critical speed points whereupon the speed at which the shaft tends to vibrate violently in the transverse direction. In other words, the speed at which shaft resonance occurs is known as the critical speed. At critical speeds, the amplitude of vibration of rotors is excessively large and a large amount of force is transmitted to the bearings of the servo motor. The system may even fail because of violent nature of vibrations in the transverse direction. Therefore, it is important to reduce or eliminate whipping so as to avoid critical failure during high-speed actuation. This problem necessarily limits overall speed of eth control algorithm in conventional servo motor applications.

BRIEF DESCRIPTION OF THE DRAWINGS

Embodiments of the subject matter disclosed herein in accordance with the present disclosure will be described with reference to the drawings, in which.

Note that the same numbers are used throughout the disclosure and figures to reference like components and features.

DETAILED DESCRIPTION

Figure 1:
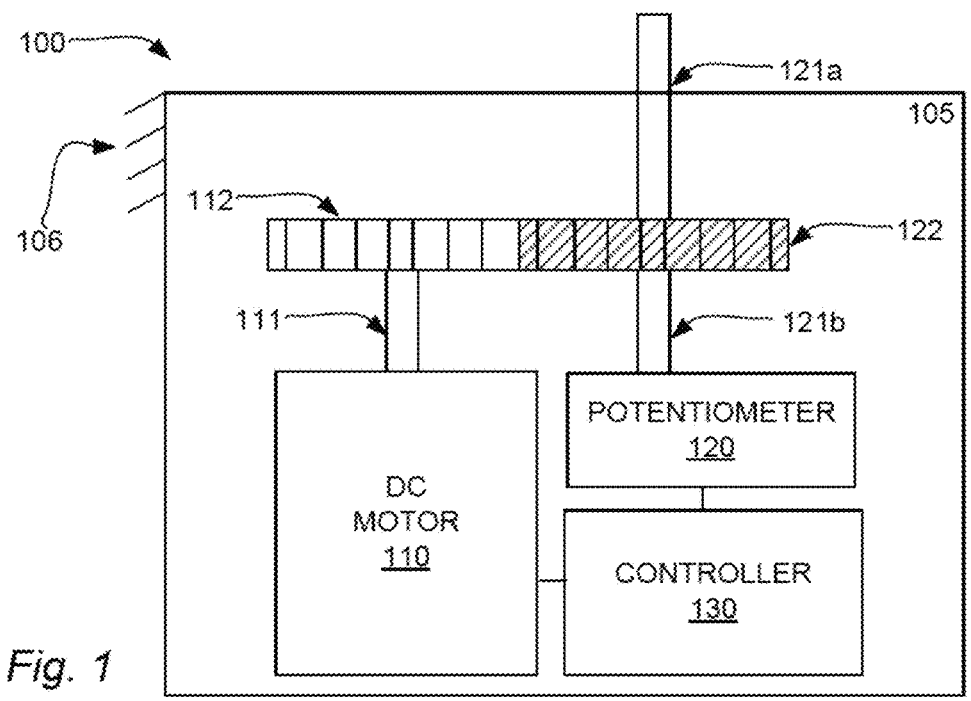
FIG. 1 is a diagram of a conventional servo motor having a fixed housing configured to rotate a shaft.

The subject matter of embodiments disclosed herein is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments will be described more fully hereinafter with reference to the accompanying drawings, which form a part hereof, and which show, by way of illustration, exemplary embodiments by which the systems and methods described herein may be practiced. This systems and methods may, however, be embodied in many different forms and should not be construed as limited to the embodiments set forth herein; rather, these embodiments are provided so that this disclosure will satisfy the statutory requirements and convey the scope of the subject matter to those skilled in the art.

By way of an overview, the systems and methods discussed herein may be directed to a servo motor system having a direct drive motor, a controller, an encoder and a ball screw nut. The system includes a direct drive motor configured to provide rotational motion in response to a control signal. The system further includes a controller communicatively coupled to the direct drive motor and configured to provide a control signal to the direct drive motor to control the rotational motion. The system further includes an encoder coupled to the direct drive motor and the controller and configured to provide a feedback signal to the controller indictive of the rotational motion of the direct drive motor. The system further includes a rotatably attached ball screw nut coupled to a housing for the direct drive motor, the ball screw nut configured to engage a ball screw shaft such that rotational motion imparted by the direct drive motor causes the servo motor system to move about the ball screw shaft while the ball screw shaft remains stationary.

In one embodiment, an overall 3D printing system may be realized using the novel servo motor apparatus. This embodiment of this system includes a ball screw shaft fixedly attached to an assembly housing and a direct drive servo motor rotatably coupled to the ball screw shaft. As before, the direct drive servo motor includes a direct drive motor configured to provide rotational motion in response to a control signal, a controller communicatively coupled to the direct drive motor and configured to provide a control signal to the direct drive motor to control the rotational motion, an encoder coupled to the direct drive motor and the controller and configured to provide a feedback signal to the controller indictive of the rotational motion of the direct drive motor, and a rotatably attached ball screw nut coupled to a housing for the direct drive motor. The system is further characterized by the ball screw nut configured to engage a ball screw shaft such that rotational motion imparted by the direct drive motor causes the servo motor system to move about the ball screw shaft while the ball screw shaft remains stationary. This embodiment further includes a work operation area disposed in the assembly and adjacent to the direct drive servo motor device and an end effector disposed on the direct drive servo motor device and configured to perform one or more operation in the work operation area. Typically, the operation will be an additive 3D build. These and other aspects of the device and systems disclosed herein will be described in more detail in conjunction with FIGS. 1-7 below.

FIG. 1 is a diagram of a conventional servo motor 100 having a fixed housing 105 configured to rotate a shaft 111. In any servo motor, a rotary actuator or linear actuator enables precise control of motion of shaft from an angular or linear perspective which, in turn, enables precise control of shaft 111 velocity and acceleration. This conventional servo motor includes an electric DC motor 110 coupled to a controller 130 that is, in turn coupled to a sensor 120 for position feedback. In this example, the sensor is a potentiometer. The input to its control is a signal (either analog or digital) representing the position commanded for the output shaft. Together, the DC motor 110, the controller 130 and the sensor 120 provide a closed-loop control system that uses position feedback to control motor actuation and motion to achieve a specific position of a rotating shaft 111.

As is typical, the rotating motor shaft 111 is coupled to an engagement gear 112 that is then mechanically coupled to another gear 122 that is integrally part of an actuation shaft 121a-121b. As shown in this example the actuation shaft includes a lower portion that has rotational position measured by the sensor and an upper portion that may be attached to a ball screw and/or actuation shaft (not shown). Thus, as the DC motor rotates, this motion is translated to the actuation shaft (ball screw) to maneuver an object (e.g., wheels, printer head, robotic arm, or the like) via rotational action. This rotational position is imparted via a rotating ball screw 121a which moves while the overall servo motor is fixed in place as indicated by the fixed position markings 106 of the housing 105. As discussed in the remainder of this detailed description, shifting the focus of the fixed portion of the servo motor and actuated object relationship eliminates conventional problems from critical speed limitations and whipping. These aspects are discussed next in FIGS. 2-7.

Figure 2:
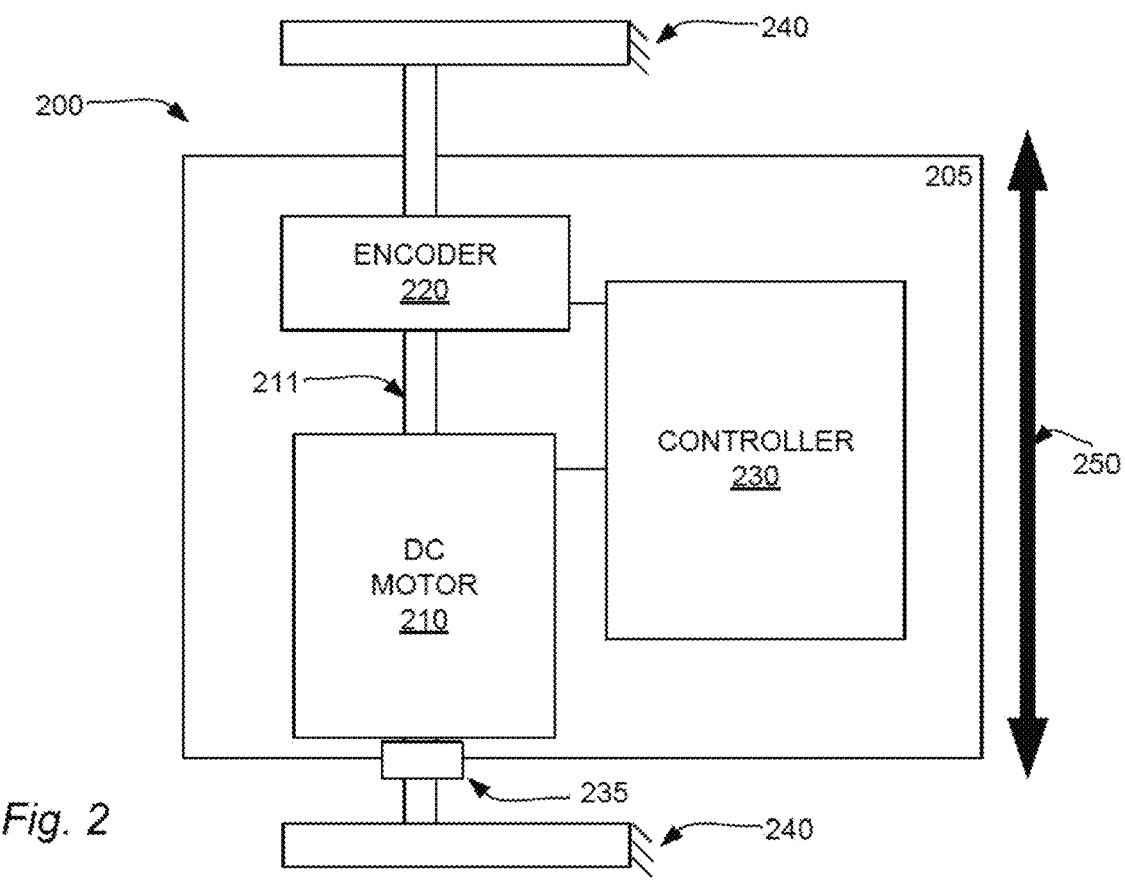
FIG. 2 is a diagram of a servo motor having a stationary ball screw according to an embodiment of the subject matter disclosed herein.

FIG. 2 is a diagram of a servo motor system 200 having a stationary ball screw 211 according to an embodiment of the subject matter disclosed herein. In this embodiment, a motor 210 (e.g., a rotary actuator or linear actuator) enables precise control of motion about a ball screw shaft 211 from an angular or linear perspective which, in turn, enables precise control of motion enabled by the motor 210. In one embodiment, the motor 210 may be a permanent magnet direct current (DC) synchronous motor. In this novel system, however, the ball screw 211 (e.g., drive mechanism) is fixed and the entire motor housing 205 translates (e.g., is moved) along the axis 250 of the ball screw 211. That is, the servo motor housing 205 (and any end effector attached thereto) may be actuated along a linear axis 250 of the ball screw shaft 211 wherein precise control of velocity and acceleration is still achieved. The servo motor system 200 includes an electric DC motor 210 coupled to a controller 230 that is, in turn coupled to a sensor 220 for rotational position feedback. In this example, the sensor 220 is a rotary encoder, but any other manner of determining precise rotation count for the motor or the ball screw shaft 211 may be used. Such additional examples include relative and absolute rotary encoders of the magnetic or optical type, hall-effect sensors that motor field windings, or Back-EMF measurement. The input to the control of the motor 210 is a signal (either analog or digital) from the controller 230 representing the position commanded for a location of the servo motor housing 205 along the ball screw shaft 211. Together, the motor 210, the controller 230 and the sensor 220 provide a closed-loop control system that uses position feedback to control the motor 210 actuation and motion to achieve a specific position of the overall servo motor housing with respect to the ball screw shaft 211.

In this novel system, the ball screw shaft 211 is fixed between two anchor points 240. Further, the servo motor housing 205 includes at least one rotatably attached ball nut 235 by which the servo motor housing engages the ball screw shaft 211. That is, a conventional ball nut on a conventional servo motor is fixed such that the ball screw shaft 211 rotates. By allowing the ball nut 235 to freely rotate as well as anchoring the ball screw shaft 211, it is the entire servo motor housing 205 that is actuated along the linear axis 250. This provides significant advantage in that the load is directly actuated on a fixed ball screw shaft 211, eliminating the inertial load typically generated on the primary axis of the ball screw with the conventional servo motor of FIG. 1. Loads driven directly by these conventional motors of FIG. 1 can only operate through the utilization of belt or chain drive that limit speed, accuracy, and power.

As the entire servo motor housing 205 can be moved, any end effector (not shown in FIG. 2) attached to the servo motor housing 205 may be maneuvered to a specific location wherein a specific task may be accomplished when the end effector is in position (e.g., provide additive in a 3D build, for example). Further, the motor may include more than one rotatable attached ball nut 235 such that stability is achieved by having support at more than one position along the ball screw shaft 211.

In the embodiment of FIG. 2, a direct drive servo motor 210 is depicted and described. However, this type of DC motor is not critical to a servo motor and different motor/drive types may be used. At the simplest, brushed permanent magnet motors are used, owing to their simplicity and low cost. Small industrial servo motors are typically electronically commutated brushless motors. For large industrial servo motors, AC induction motors may be typically used, often with variable frequency drives to allow control of their speed. For ultimate performance in a compact package, brushless AC motors with permanent magnet fields may be used, effectively large versions of Brushless DC electric motors. Drive modules for servo motors may be a standard industrial component. The design of various drive modules may include designs based on a three-phase MOSFET or IGBT H bridge. These standard modules accept a single direction and pulse count (rotation distance) as input. They may also include over-temperature monitoring, over-torque and stall detection features.

In the embodiment of FIG. 2, the servo motor system is depicted as separate blocks for the DC motor 210, the encoder, 220 and the controller 230. However, in other embodiments, the servo motor system may be a single integrated servo motors system that are designed so as to include the motor 210, controller 230, encoder 220 and associated electronics into a single integrated package.

Further, the encoder 220 (which may also include an encoder read head 221—shown in FIG. 3) may be one of several different types of encoders. In a first embodiment, the encoder 220 may be a resistive potentiometer configured to indicate an absolute position along an axis, (e.g., a position encoder). Potentiometers may be used as a simple and inexpensive option. Potentiometers, however, suffer from wear and electrical noise in the potentiometer track. Another option for the encoder 220 is a PID controller. Although it is possible to electrically differentiate a position signal to obtain a speed signal, PID controllers that can make use of such a speed signal generally warrant a more precise encoder 220. In yet another embodiment, the encoder 220 may be a rotary encoder, either absolute or incremental. Absolute encoders 220 can determine position at power-on but are more complicated and expensive. Incremental systems, like stepper motors, often combine an inherent ability to measure intervals of rotation with a simple zero-position sensor to set their position at start-up. In another embodiment, the encoder-motor combination may be a motor with a separate, external, linear encoder 220. These motor+linear encoder systems avoid inaccuracies in the drivetrain between the motor and linear carriage, but the design is made more complicated as these are no longer a prepackaged factory-made system.

The servo motor system 200 of FIG. 2 has many advantages over conventional servo motor systems of FIG. 1. These advantages include reduction or even elimination of effects of inertia and whipping. This will result in speeds of about five to ten times faster. Further, the servo motor housing 205 may be made from extruded aluminum or billeted aluminum that is lightweight, thereby contributing to less effect form inertia and faster overall speeds without whipping.

Figure 3:
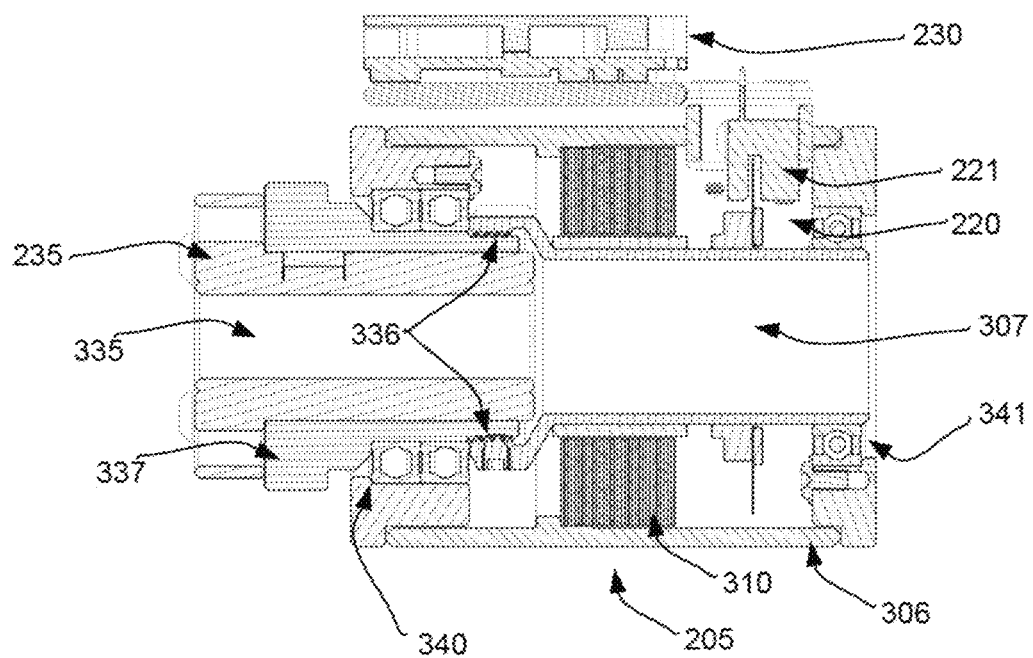
FIG. 3 is a plan view of the servo motor of FIG. 2 configured to engage a stationary ball screw according to an embodiment of the subject matter disclosed herein.

FIG. 3 is a plan view of the servo motor 205 of FIG. 2 configured to engage a stationary ball screw (not shown in FIG. 3) according to an embodiment of the subject matter disclosed herein. In this plan view, one can see an orifice 335 that is configured to size to engage a stationary ball screw. The stationary ball screw may be engaged by a rotatably attached ball screw nut 235 that is rotatably engaged with a ball screw nut housing 337 that may be secured at anchor points 336 to the housing 306 of the servo motor 205. The ball screw nut housing 337 is supported by a fixed bearing assembly 340 to disallow axial movement of the ball screw nut housing 337 while in motion. That is, this fixed bearing assembly 340 prevents the ball screw nut housing 337 from rotating about the stationary ball screw (435 of FIG. 4) even when lateral motion may also be imparted to the entire servo motor 205. Further, servo motor windings 310 may be disposed about a rotor 307 such that linear motion may be imparted to the entire servo motor 205 when the rotatably attached ball screw nut 335 is actuated against the stationary ball screw. The rotor 307 is further supported for radial support as well as provide a seal and mounting with a floating bearing assembly 341.

In FIG. 3, the encoder may further comprise two specific components, an encoder disk 220 attached to the rotor 307 and an encoder read head 221 which is fixed to the motor housing 205. Of note, this design may dispose the encoder read head 221 on the floating bearing assembly 341, rather than attach to the housing 306.

Figure 4:
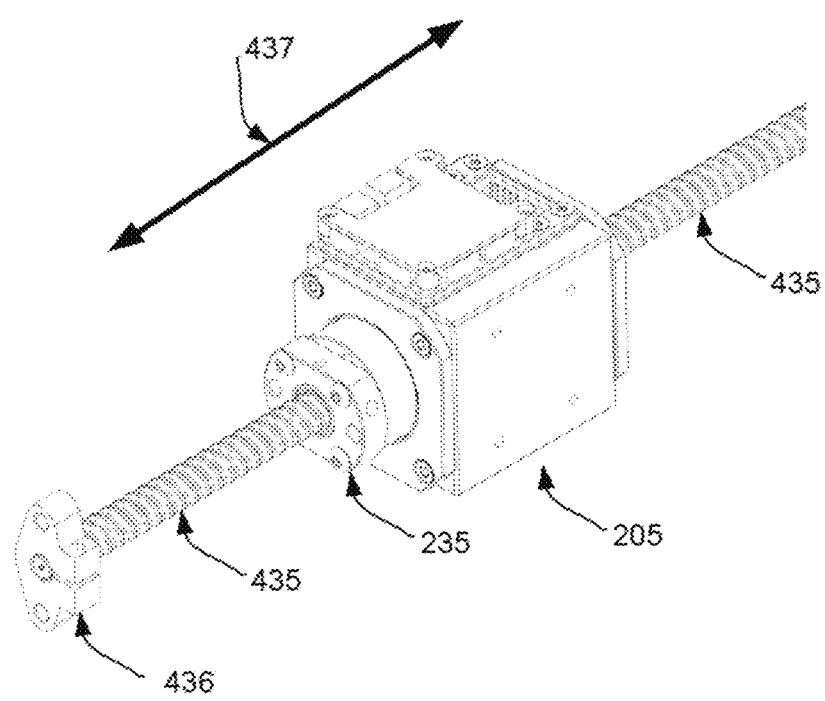
FIG. 4 is an isometric view of the servo motor of FIG. 2 engaged with a stationary ball screw according to an embodiment of the subject matter disclosed herein.

FIG. 4 is an isometric view of the servo motor 205 of FIG. 2 engaged with a stationary ball screw 435 according to an embodiment of the subject matter disclosed herein. The ball screw nut 235, being rotatably attached in this novel servo motor system 205 allows for the entire servo motor 205 to move about a stationary ball screw 435. This lateral motion about the stationary ball screw 435 is shown as direction 437. As alluded to with respect to conventional systems where a rotating ball screw would experience resonance and whipping due to screw imbalances resulting in limited critical rotational velocities, this novel approach anchors the ball screw 435, mitigating screw whip and resonance completely. With the ball screw 435 affixed at anchor point 436 (and similar one on opposite end, not shown), in conjunction with the servo motor 205 having a rotatable attached ball screw nut 235, lateral motion is imparted more efficiently and effectively as no inertial load from a rotating ball screw is imparted to the servo motor drive.

Figure 5:
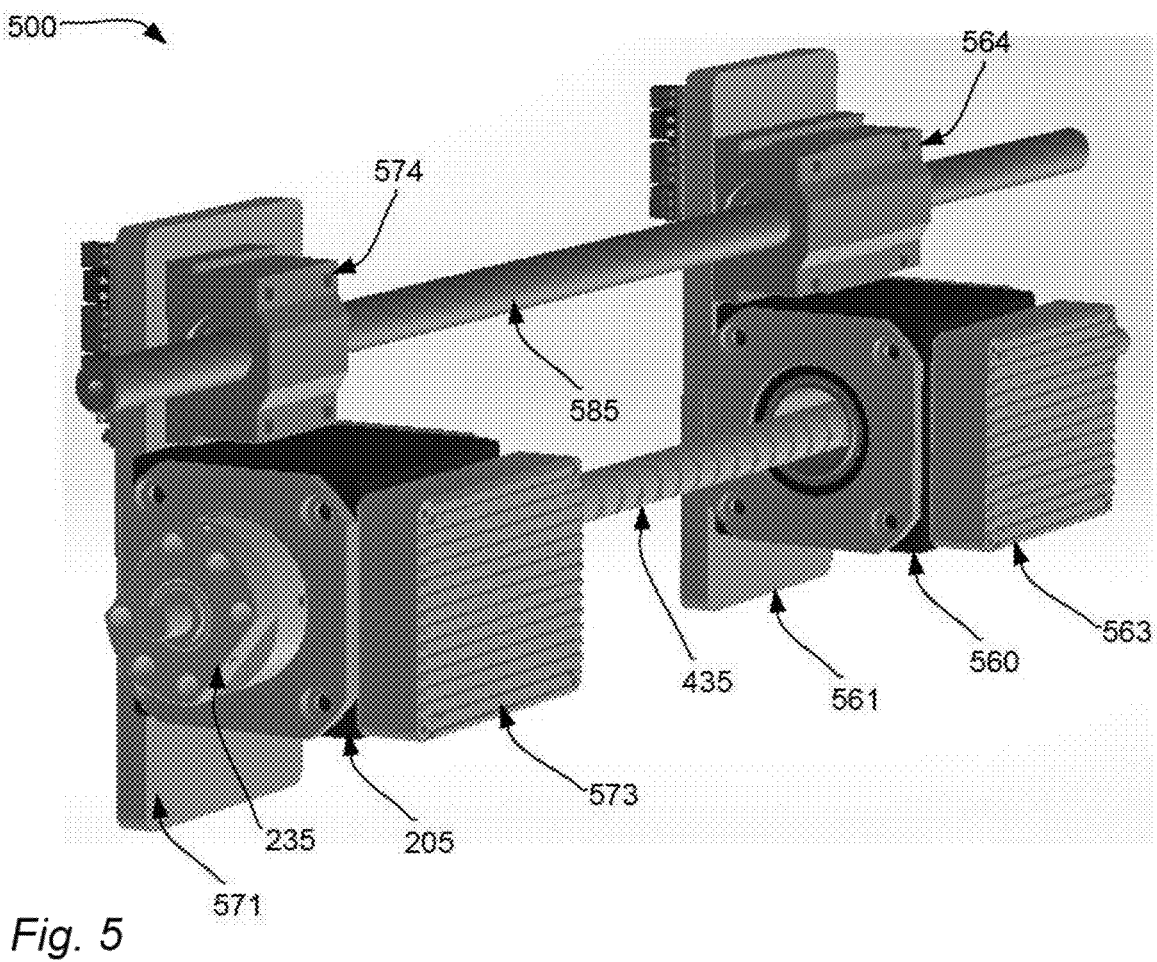
FIG. 5 is a system view having two servo motors of FIG. 2 according to an embodiment of the subject matter disclosed herein.

FIG. 5 is a system 400 view having two servo motors of FIG. 2 according to an embodiment of the subject matter disclosed herein. In this embodiment, a first servo motor 460 is shown as well as a second servo motor 470. Each servo motor 460 and 470 is mechanically engaged with a single ball screw 480 and each servo motor includes a respectively attached end effector 463 and 473. Further, each servo motor 460 and 470 is coupled to a respective mount 461 and 471 that may, in turn, be coupled to respective guides 464 and 474 that are engaged with a guide rail 485 for providing stability to the movement of the respective servo motors 460 and 470. This embodiment may be part of an overall system, such as a 3D printer, as discussed with respect to FIG. 7.

Figure 6:
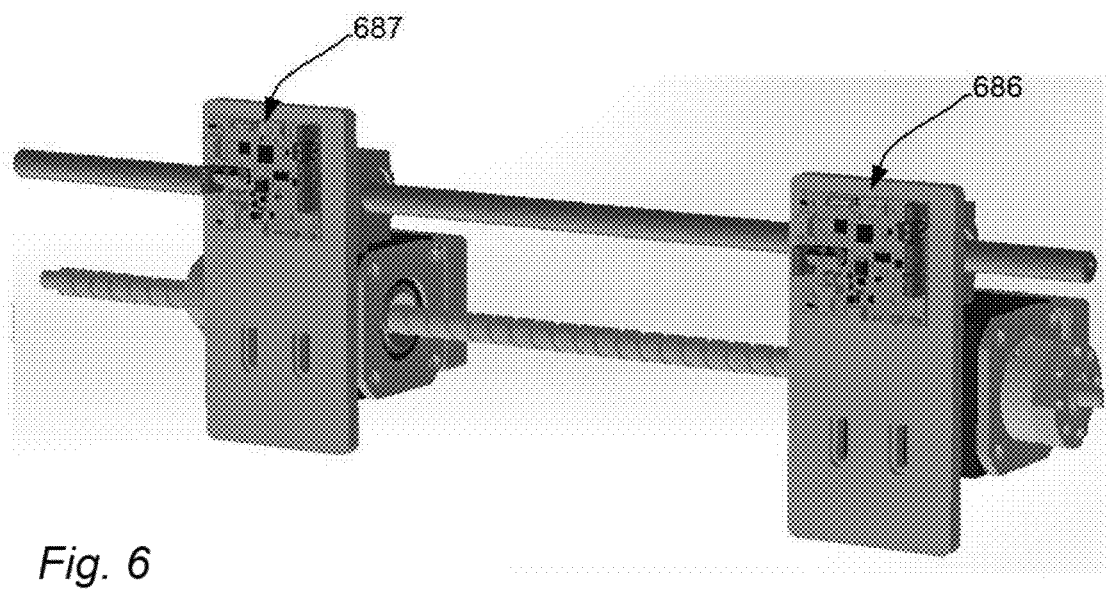
FIG. 6 is another system view having two servo motors of FIG. 2 with printer heads attached thereto according to an embodiment of the subject matter disclosed herein.

FIG. 6 is another system view having two servo motors of FIG. 2 with printer heads controllers attached thereto according to an embodiment of the subject matter disclosed herein. This depiction shows the system 400 of FIG. 4 from an alternative perspective that also includes local controllers 486 and 487 for controlling the end effectors attached respectively thereto. This application allows for multiple independent loads to be actuated on the same linear axis, referred to as Independent Dual Extrusion (IDEX) in additive manufacturing, which is enabled by the fixed ball screw architecture.

Figure 7:
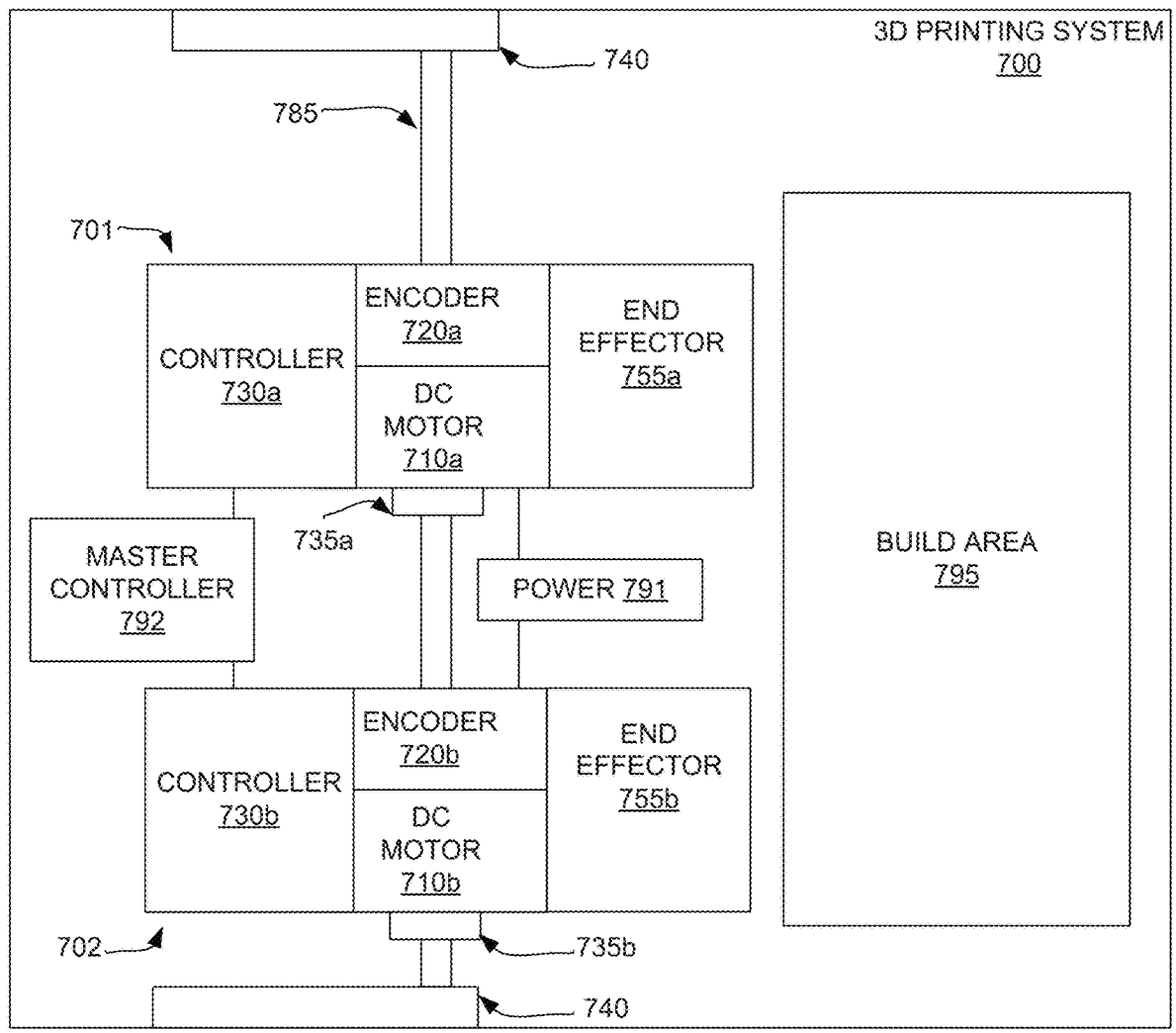
FIG. 7 is a block diagram of a 3D printing system configured to use one or more servo motors of FIG. 2 according to an embodiment of the subject matter disclosed herein.

FIG. 7 is a block diagram 700 of a 3D printing system configured to use one or more servo motors of FIG. 2 according to an embodiment of the subject matter disclosed herein. In this embodiment, the system 700 may include a first servo motor system 701 and a second servo motor system 702 that are mechanically engaged with a single ball screw 785. The ball screw in statically mounted to anchor points 740 such that the ball screw cannot rotate and any servo motor actuation results in the servo motor systems 701/702 moving about eth axis of the ball screw 785. Each servo motor system includes a respective DC motor 710$a/b$, an encoder 720$a/b$, a controller 730$a/b$ and an end effector 755$a/b$. Further, the system includes a build area 795 wherein each of the end effectors may facilitate the impartation of a 3D build therein. The system may also include a power system 791 (either attached AC power system of battery-based DC power system) as well as a local master controller 792 that can control the servo motor systems 701/702.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments and does not pose a limitation to the scope of the disclosure unless otherwise claimed. No language in the specification should be construed as indicating any non-claimed element as essential to each embodiment of the present disclosure.

Different arrangements of the components depicted in the drawings or described above, as well as components and steps not shown or described are possible. Similarly, some features and sub-combinations are useful and may be employed without reference to other features and sub-combinations. Embodiments have been described for illustrative and not restrictive purposes, and alternative embodiments will become apparent to readers of this patent. Accordingly, the present subject matter is not limited to the embodiments described above or depicted in the drawings, and various embodiments and modifications can be made without departing from the scope of the claims below.

That which is claimed is:

1. A servo motor system, comprising:
a direct drive motor configured to provide rotational motion in response to a control signal;
a controller communicatively coupled to the direct drive motor and configured to provide a control signal to the direct drive motor to control the rotational motion;
an encoder coupled to the direct drive motor and the controller and configured to provide a feedback signal to the controller indictive of the rotational motion of the direct drive motor; and
a rotatably attached ball screw nut coupled to a housing for the direct drive motor, the ball screw nut configured to engage a ball screw shaft such that rotational motion imparted by the direct drive motor causes the servo motor system to move about the ball screw shaft while the ball screw shaft remains stationary.

2. The servo motor system of claim 1, wherein the controller comprises a wireless component for receiving a wireless control communication from a remote system.

3. The servo motor system of claim 1, wherein the encoder further comprises a digital encoder configured to determine a digital signal indicating rotational motion of the direct drive motor.

4. The servo motor system of claim 1, further comprising the ball screw shaft fixed on first end and second end such that the ball screw shaft is anchored and stationary.

5. The servo motor system of claim 1, wherein the direct drive motor further comprises a brushless DC direct drive motor.

6. The servo motor system of claim 1, further comprising at least one guide rail slidably coupled to direct drive motor housing.

7. The servo motor system of claim 1, further comprising an end effector coupled to the direct drive motor.

8. The servo motor system of claim 1, further comprising an over-torque monitoring device configured to interrupt operation of the direct drive motor in response to detecting rotational torque over a threshold torque.

9. The servo motor system of claim 1, further comprising a stall detection device configured to interrupt operation of the direct drive motor in response to detecting a lack of rotational motion by the direct drive motor.

10. The servo motor system of claim 1, further comprising an over-temperature monitoring device configured to interrupt operation of the direct drive motor in response to detecting a temperature over a threshold temperature.

11. A system, comprising:
a ball screw shaft fixedly attached to an assembly housing;
a direct drive servo motor rotatably coupled to the ball screw shaft, the direct drive servo motor comprising:
a direct drive motor configured to provide rotational motion in response to a control signal;
a controller communicatively coupled to the direct drive motor and configured to provide a control signal to the direct drive motor to control the rotational motion;
an encoder coupled to the direct drive motor and the controller and configured to provide a feedback signal to the controller indictive of the rotational motion of the direct drive motor; and
a rotatably attached ball screw nut coupled to a housing for the direct drive motor, the ball screw nut configured to engage a ball screw shaft such that rotational motion imparted by the direct drive motor causes the servo motor system to move about the ball screw shaft while the ball screw shaft remains stationary;
work operation area disposed in the assembly and adjacent to the direct drive servo motor device; and
an end effector disposed on the direct drive servo motor device and configured to perform one or more operation in the work operation area.

12. The system of claim 11 wherein the end effector comprises one or more 3D printer heads.

13. The system of claim 11, further comprising a second direct drive servo motor rotatably coupled to the ball screw shaft.

14. The system of claim 11 wherein the work operation area further comprises a 3D print bay and the assembly further comprises a 3D printer.

15. The system of claim 11, further comprising a remote computer system communicate coupled to the controller and configured to control motion of the direct drive servo motor.

16. A method, comprising:
engaging a stationary ball screw shaft with a rotatably attached ball screw nut that is part of a direct drive motor;
transmitting a control signal to a controller coupled to the direct drive motor that is part of a servo motor assembly configured to cause rotational motion of the ball screw nut in response to the control signal;
detecting imparted motion of the direct drive motor through an encoder coupled directly to the direct drive motor, the imparted motion responsive to the control signal;
moving the servo motor assembly laterally with respect to the stationary ball screw shaft.

17. The method of claim 16 further comprising:
engaging the stationary ball screw shaft with a second rotatably attached ball screw nut that is part of a second direct drive motor;
transmitting a second control signal to a second controller coupled to the second direct drive motor that is part of a second servo motor assembly configured to cause rotational motion of the second ball screw nut in response to the second control signal;
detecting imparted motion of the second direct drive motor through a second encoder coupled directly to the second direct drive motor, the imparted motion responsive to the second control signal;
moving the second servo motor assembly laterally with respect to the stationary ball screw shaft.

18. The method of claim 16 wherein transmitting the control signal further comprises transmitting a digital control signal and detecting imparted motion further comprises detecting digital pulse counts from the encoder.

19. The method of claim 16 wherein transmitting the control signal further comprises transmitting a wireless control signal.

20. The method of claim 16 further comprising actuating an end effector in response to detecting the imparted motion reaching an operable position with respect to an object in an operation area adjacent to the servo motor assembly.

\* \* \* \* \*